(12) United States Patent
Berduque et al.

(10) Patent No.: US 10,620,151 B2
(45) Date of Patent: Apr. 14, 2020

(54) ELECTROCHEMICAL SENSOR, AND A METHOD OF FORMING AN ELECTROCHEMICAL SENSOR

(71) Applicant: Analog Devices Global, Hamilton (BM)

(72) Inventors: Alfonso Berduque, County Clare (IE); Helen Berney, Raheen (IE); William Allan Lane, Waterfall (IE); Raymond J. Speer, Dalkey (IE); Brendan Cawley, County Limerick (IE); Donal Mcauliffe, Raheen (IE); Patrick Martin McGuinness, Pallaskenry (IE)

(73) Assignee: Analog Devices Global, Hamilton (BM)

( * ) Notice: Subject to any disclaimer, the term of this patent is extended or adjusted under 35 U.S.C. 154(b) by 125 days.

(21) Appl. No.: 15/251,833

(22) Filed: Aug. 30, 2016

(65) Prior Publication Data

US 2018/0059044 A1 Mar. 1, 2018

(51) Int. Cl.
*G01N 27/403* (2006.01)
*G01N 27/404* (2006.01)

(52) U.S. Cl.
CPC ........ *G01N 27/403* (2013.01); *G01N 27/4045* (2013.01)

(58) Field of Classification Search
CPC ............ G01N 27/403; G01N 27/4035; G01N 27/404; G01N 27/4045
See application file for complete search history.

(56) References Cited

U.S. PATENT DOCUMENTS

| 1,164,372 A | 12/1915 | Lundag |
| 4,132,616 A | 1/1979 | Tantram et al. |
| 4,169,779 A | 10/1979 | Tataria et al. |
| 4,184,937 A | 1/1980 | Tataria et al. |
| 4,474,648 A | 10/1984 | Tantram et al. |

(Continued)

FOREIGN PATENT DOCUMENTS

| CN | 102466654 B | 3/2014 |
| DE | 102009047299 A1 | 7/2011 |

(Continued)

OTHER PUBLICATIONS

"U.S. Appl. No. 14/879,738, Non Final Office Action dated Nov. 24, 2017", 17 pgs.

(Continued)

*Primary Examiner* — Eli S Mekhlin
(74) *Attorney, Agent, or Firm* — Schwegman Lundberg & Woessner, P.A.

(57) ABSTRACT

An electrochemical sensor is provided which may be formed using micromachining techniques commonly used in the manufacture of integrated circuits. This is achieved by forming microcapillaries in a silicon substrate and forming an opening in an insulating layer to allow environmental gases to reach through to the top side of the substrate. A porous electrode is printed on the top side of the insulating layer such that the electrode is formed in the opening in the insulating layer. The sensor also comprises at least one additional electrode. The electrolyte is then formed on top of the electrodes. A cap is formed over the electrodes and electrolyte. This arrangement may easily be produced using micromachining techniques.

20 Claims, 14 Drawing Sheets

(56) References Cited

U.S. PATENT DOCUMENTS

| | | | |
|---|---|---|---|
| 4,492,622 A | 1/1985 | Kuypers | |
| 4,595,486 A | 6/1986 | Schmidt et al. | |
| 4,739,380 A | 4/1988 | Lauks et al. | |
| 4,765,864 A | 8/1988 | Holland et al. | |
| 4,784,720 A | 11/1988 | Douglas | |
| 4,812,221 A * | 3/1989 | Madou | G01N 27/4045 204/412 |
| 4,855,017 A | 8/1989 | Douglas | |
| 4,874,499 A | 10/1989 | Smith et al. | |
| 4,874,500 A * | 10/1989 | Madou | G01N 27/403 204/408 |
| 4,900,405 A | 2/1990 | Otagawa et al. | |
| 4,925,544 A | 5/1990 | Goldring | |
| 5,217,595 A | 6/1993 | Smith et al. | |
| 5,304,293 A | 4/1994 | Tierney | |
| 5,331,310 A | 7/1994 | Stetter et al. | |
| 5,358,619 A | 10/1994 | Suzuki | |
| 5,376,255 A | 12/1994 | Gumbrecht et al. | |
| 5,501,893 A | 3/1996 | Laermer et al. | |
| 5,521,101 A | 5/1996 | Saini et al. | |
| 5,575,930 A | 11/1996 | Tietje-girault et al. | |
| 5,650,054 A | 7/1997 | Shen et al. | |
| 5,746,899 A | 5/1998 | Finbow et al. | |
| 6,168,948 B1 | 1/2001 | Anderson et al. | |
| 6,265,750 B1 | 7/2001 | Feng et al. | |
| 6,663,756 B2 | 12/2003 | Lee et al. | |
| 6,695,959 B2 | 2/2004 | Kiesele | |
| 6,853,258 B2 | 2/2005 | Toliver et al. | |
| 6,948,352 B2 | 9/2005 | Rabbett et al. | |
| 7,077,938 B1 | 7/2006 | Austen et al. | |
| 7,279,080 B2 | 10/2007 | Chapples et al. | |
| 7,498,266 B2 | 3/2009 | Richter et al. | |
| 7,534,333 B2 | 5/2009 | Khalafpour | |
| 7,767,068 B2 | 8/2010 | Lauks et al. | |
| 8,266,795 B2 | 9/2012 | Wagner | |
| 8,535,498 B2 | 9/2013 | Inoue et al. | |
| 8,551,322 B2 | 10/2013 | Schoenfisch et al. | |
| 8,623,189 B2 | 1/2014 | Eckhardt | |
| 8,784,640 B2 | 7/2014 | Coulon et al. | |
| 8,795,484 B2 | 8/2014 | Stetter et al. | |
| 9,097,652 B2 | 9/2015 | Say | |
| 9,458,502 B2 | 10/2016 | Rothberg et al. | |
| 9,617,149 B2 | 4/2017 | Lagae et al. | |
| 2002/0123048 A1 * | 9/2002 | Gau | B01L 3/5088 435/6.11 |
| 2002/0187260 A1 | 12/2002 | Sheppard, Jr. et al. | |
| 2003/0010808 A1 | 1/2003 | Uhland et al. | |
| 2003/0049865 A1 | 3/2003 | Santini, Jr. et al. | |
| 2003/0104590 A1 | 6/2003 | Santini, Jr. et al. | |
| 2003/0105455 A1 | 6/2003 | Santini, Jr. et al. | |
| 2004/0026246 A1 | 2/2004 | Chapples et al. | |
| 2004/0034332 A1 | 2/2004 | Uhland | |
| 2004/0106914 A1 | 6/2004 | Coppeta et al. | |
| 2004/0106953 A1 | 6/2004 | Yomtov et al. | |
| 2004/0121486 A1 | 6/2004 | Uhland et al. | |
| 2004/0143236 A1 | 7/2004 | Santini, Jr. et al. | |
| 2005/0050859 A1 | 3/2005 | Coppeta et al. | |
| 2005/0055014 A1 | 3/2005 | Coppeta et al. | |
| 2005/0096587 A1 | 5/2005 | Santini, Jr. et al. | |
| 2005/0145330 A1 | 7/2005 | Shubinsky et al. | |
| 2006/0057737 A1 | 3/2006 | Santini, Jr. et al. | |
| 2006/0076236 A1 | 4/2006 | Shah et al. | |
| 2006/0100608 A1 | 5/2006 | Uhland et al. | |
| 2006/0105275 A1 | 5/2006 | Maloney et al. | |
| 2006/0115323 A1 | 6/2006 | Coppeta et al. | |
| 2006/0171888 A1 | 8/2006 | Santini, Jr. et al. | |
| 2006/0234042 A1 | 10/2006 | Yang et al. | |
| 2007/0036835 A1 | 2/2007 | Coppeta et al. | |
| 2007/0299385 A1 | 12/2007 | Santini, Jr. et al. | |
| 2008/0115361 A1 | 5/2008 | Santini, Jr. et al. | |
| 2008/0115559 A1 | 5/2008 | Santini, Jr. et al. | |
| 2008/0128285 A1 | 6/2008 | Moon et al. | |
| 2008/0168921 A1 | 7/2008 | Uhland et al. | |
| 2008/0221557 A1 | 9/2008 | Santini, Jr. | |
| 2008/0302659 A1 | 12/2008 | Sheppard, Jr. et al. | |
| 2009/0018413 A1 | 1/2009 | Santini, Jr. | |
| 2009/0024113 A1 | 1/2009 | Maloney et al. | |
| 2009/0030404 A1 | 1/2009 | Uhland | |
| 2009/0112188 A1 | 4/2009 | Santini, Jr. et al. | |
| 2009/0142386 A1 | 6/2009 | Prescott et al. | |
| 2009/0234214 A1 | 9/2009 | Santini, Jr. et al. | |
| 2009/0301876 A1 | 12/2009 | Wagner et al. | |
| 2010/0042075 A1 | 2/2010 | Santini, Jr. et al. | |
| 2010/0137696 A1 | 6/2010 | Santini, Jr. et al. | |
| 2010/0236924 A1 | 9/2010 | Chapples et al. | |
| 2012/0130339 A1 | 5/2012 | Farra | |
| 2012/0181185 A1 * | 7/2012 | Vitushinsky | G01N 27/4141 205/775 |
| 2013/0126349 A1 | 5/2013 | Zhang | |
| 2013/0181760 A1 | 7/2013 | Lin | |
| 2014/0062596 A1 | 3/2014 | Glibbery | |
| 2014/0202855 A1 * | 7/2014 | Merz | G01N 27/26 204/406 |
| 2014/0202856 A1 | 7/2014 | Roxhed et al. | |
| 2015/0001076 A1 * | 1/2015 | Porro | G01N 27/26 204/412 |
| 2015/0009503 A1 | 1/2015 | Shimoyama et al. | |
| 2015/0128715 A1 | 5/2015 | Kamimura et al. | |
| 2016/0178565 A1 | 6/2016 | Chapples et al. | |
| 2017/0102355 A1 | 4/2017 | McGuinness et al. | |
| 2019/0195825 A1 | 6/2019 | Berduque et al. | |
| 2019/0242847 A1 | 8/2019 | Berduque et al. | |

FOREIGN PATENT DOCUMENTS

| | | |
|---|---|---|
| EP | 0284518 A2 | 9/1988 |
| EP | 0299779 A2 | 1/1989 |
| EP | 0299779 B1 | 6/1995 |
| EP | 0588153 B1 | 12/1996 |
| EP | 0586982 B1 | 7/1998 |
| EP | 1164372 B1 | 3/2010 |
| EP | 1305837 B1 | 11/2010 |
| EP | 2361380 B1 | 2/2015 |
| GB | 2312753 B | 9/1999 |
| JP | 2000-235012 A | 8/2000 |
| WO | WO-90/15323 A1 | 12/1990 |
| WO | WO-02/073177 A2 | 9/2002 |
| WO | WO-2016097304 A1 | 6/2016 |
| WO | WO-2017060769 | 3/2017 |
| WO | WO-2017060769 A1 | 4/2017 |

OTHER PUBLICATIONS

"International Application Serial No. PCT/EP2017/071669, Invitation to Pay Add'l Fees and Partial Search Report dated Jan. 17, 2018", 11 pgs.

Huang, Yue, et al., "Lab-on-CMOS Integration of Microfluidics and Electrochemical Sensors", Proceedings of the 2011 6th IEEE International Conference on Nano/Micro Engineered and Molecular Systems, (Feb. 2011), 690-693.

Singh, Virendra V, et al., "Applicatons of Ionic Liquids in Electrochemical Sensors and Biosensors", Hindawi Publishing Corporation International Journal of Electrochemistry vol. 2012, Article ID 165683, (Aug. 10, 2011), 20 pgs.

Maseeh, Fariborz, et al., "A Novel Silicon Micro Amperometric Gas Sensor", (1991), 359-362.

Van Der Wal, P. D., et al., "The development of a Nafion based amperometric carbon monoxide sensor for domestic safety", *Analusis*, 27, No. 4, [Online]. Retrieved from the Internet: <URL: http://analusis.edpsciences.org or http://dx.doi.org/10.1051/analusis:1999270347, (1999), 347-351.

"U.S. Appl. No. 14/879,738, Response filed Apr. 24, 2018 to Non Final Office Action Nov. 24, 2017", 11 pgs.

"International Application Serial No. PCT/EP2017/071669, International Search Report dated Apr. 19, 2018", 6 pgs.

"International Application Serial No. PCT/EP2017/071669, Written Opinion dated Apr. 19, 2018", 10 pgs.

"Hydrogen Sulfide 500 HS 4S", Sensor Datasheet H2S 500 HS 4S Rev12-11-15.doc, (Dec. 11, 2015), 2 pgs.

"Nitrogen Dioxide Micro+ Technical Specification", Sensor Datasheet NO$_2$ 100 Micro+, Rev13-02-26.doc, (Feb. 26, 2013), 2 pgs.

(56) References Cited

OTHER PUBLICATIONS

Bai, Hua, et al., "Gas sensors based on conducting polymers", [online]. [retrieved on Apr. 19, 2016]. Retrieved from the internet:<URL:http://www.ncbi.nlm.nih.gov/pmc/articles/PMC3756721/#b219sensors0700267>, (Mar. 7, 2007), 1-33.

Berduque, Alfonso, et al., "Electrochemical detection of dopamine using arrays of liquid-liquid micro-interfaces created within micromachined silicon membranes", *Analytica Chimica Acta*, 611, (2008), 156-162.

Berduque, Alfonso, et al., "Voltammetric charachterisation of silocon-based microelectrode arrays and their application to mercury-free stripping voltammetry of copper ions", *Talanta*, 71, (2007), 1022-1030.

Hung, Wen Tung, et al., "An Electrochemical Gas Sensor for Nitrogen Dioxide based on Pt/Nafion Electrode", *Journal of New Materials for Electrochemical Systems*, 5, (2002), 305-313.

Ishizu, K, et al., "Carbon dioxide gas sensor with ionic gel", *IEEE Transducers 2013*, Barcelona, Spain, Jun. 16-20, 2013, (2013), 1633-1636.

Joo, Segyeong, "Chemical sensors with integrated electronics", *Chem. Rev.*, 108(2), (2008), 638-651.

Maclay, G. Jordan, et al., "Microfabricated Amperometric Gas Sensors", *IEEE Transactions on Electron Devices*, vol. 35, No. 6., (Jun. 1988), 793-799.

Madou, Marc, et al., "Electrolytic media for chemical sensors", *Solid State Ionics*, 28-30, (1988), 1653-1659.

Mu, Xiaoyi, et al., "Fabrication of a Minaturized Room Temperature Ionic Liquid Gas Sensor for Human Health and Safety Monitoring", *2012 IEEE Biomedical Circuits and Systems Conference (BioCAS)*, (2012), 140-143.

Opekar, Frantisek, "Amperometric Solid-State Gas Sensors: Materials for Their Active Components", *Critical Reviews in Analytical Chemistry*, 32(3), (2002), 253-259.

Scanlon, Micheal D., et al., "Ion-Transfer Eletrochemistry at Arrays of Nanointerfaces Between Immiscible Eletrolyte Solutions Confined within Silicon Nitride Nanopore Membranes", *Analytical Chemistry*, vol. 82, No. 14, (2010), 6115-6123.

Tess, Mark E., et al., "Humidity-independent solid-state amperometric sensor for carbon monoxide based on an electrolyte prepared by Sol-Gel Chemistry", *1992 American Chemical Society Analytical Chemistry*, vol. 70, No. 1, (1998), 187-190.

Walewyns, Thomas, et al., "Fabrication of a miniaturized ionization gas sensor with polymide spacer", *Conference Paper in Proceedings of SPIE—The International Society for Optical Engineering*, (May 2011), 9 pgs.

Wartelle, Corinne, et al., "Novel biocompatible hydrogel-based amperometric sensor for nitric oxide gas detection: towards a non-invasive device", *Chem. Commun., 2004*, (May 7, 2004), 1302-1303.

White, Rob, "Reducing Risks and the Cost of Gas Detection", *IET*Mar. / Apr. 2013, (Apr. 2013), 39-40.

Xiong, Linhongjia, et al., "Amperometric Gas detection: A Review", *Int. J. Electrochem. Sci.*, 9, (2014), 7152-7181.

Yan, Heqing, et al., "A solid polymer electrolyte-based electrochemical carbon monoxide sensor", *Sensors and Actuafors B*, 17, (1994), 165-168.

Yasuda, Ayumu, et al., "Electrochemical carbon monoxide sensor with a Nafion® film", *Reactive & Functional Polymers*, 41, (1999), 235-243.

Zazpe, Raul, "Characterisation of Arrays of Micro-Liquid | Liquid Interfaces", Thesis, Tyndall National Institute/University College Cork, (Sep. 2005), 138 pgs.

Zazpe, Raul, et al., "Ion-transfer voltammetry at silicon membrane-based arrays of micro-liquid-liquid interfaces", *Lab Chip*, 7, (2007), 1732-1737.

"International Application Serial No. PCT/IB2016/001518, International Search Report dated Mar. 24, 2017", 7 pgs.

"International Application Serial No. PCT/IB2016/001518, Written Opinion dated Mar. 24, 2017", 9 pgs.

Taliercio, T, et al., "Realization of porous silicon membranes for gas sensor applications", *Thin Solid Films*, 255(1-2), (1995), 310-312.

"U.S. Appl. No. 14/879,738, Response filed Aug. 23, 2017 to Restriction Requirement dated Jun. 28, 2017", 7 pgs.

"U.S. Appl. No. 14/879,738, Restriction Requirement dated Jun. 28, 2017", 10 pgs.

"U.S. Appl. No. 15/888,863, Restriction Requirement dated Aug. 1, 2019", 8 pgs.

"U.S. Appl. No. 14/879,738, Final Office Action dated Jul. 13, 2018", 17 pgs.

* cited by examiner

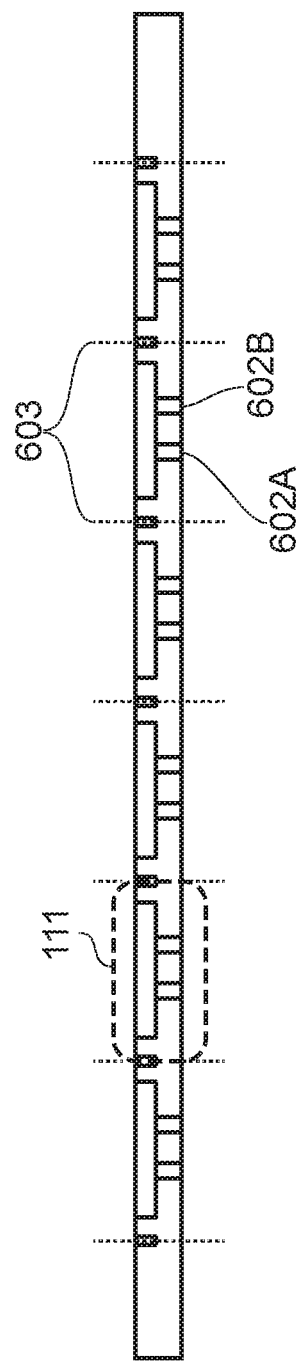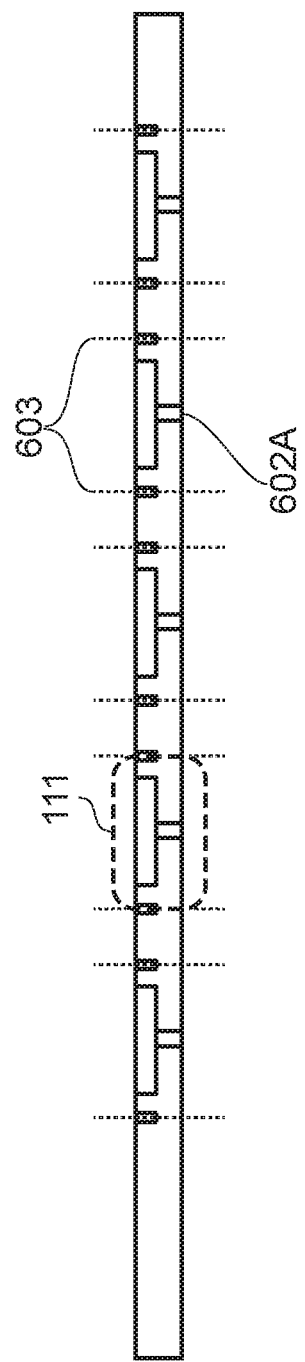
FIG. 16A
FIG. 16B

ELECTROCHEMICAL SENSOR, AND A METHOD OF FORMING AN ELECTROCHEMICAL SENSOR

FIELD OF THE DISCLOSURE

The present disclosure relates to an electrochemical sensor and a method of forming an electrochemical sensor.

BACKGROUND

Electrochemical sensors are known which typically comprise three electrodes in contact with an electrolyte. These electrodes are normally identified as a working electrode, a counter electrode and a reference electrode. Generally speaking, in such sensors, the reference electrode is held at a constant potential with respect to the working electrode. The presence of substances which interact with the working electrode/electrolyte interface can invoke current flow between the working electrode and the counter electrode as a result of reduction/oxidation (REDOX) reactions at the working electrode. Other electrochemical sensors may only have a working electrode and a counter electrode and in such sensors the potential difference, current flow or resistance between those electrodes may be measured.

Generally speaking, such electrochemical sensors are made on a one by one basis or by using techniques that are quite variable. As a result, the sensors tend to vary from one to another. In some fields of use, such as carbon monoxide sensors, this is not too much of an issue as the trigger threshold for the associated electronics to issue an alarm is set so high that there can be no doubt that an unsafe level of carbon monoxide has been reached. However, for situations where greater precision and/or resolution are required then the sensors have to be calibrated prior to use. This is generally expensive and/or time consuming. Furthermore, it is generally desirable to reduce the size of sensors, in order to increase the range devices and applications with which they can be used.

SUMMARY OF THE DISCLOSURE

An electrochemical sensor is provided which may be formed using micromachining techniques commonly used in the manufacture of integrated circuits. This is achieved by forming microcapillaries in a silicon substrate and forming an opening in an insulating layer to allow environmental gases to reach through to the top side of the substrate. A porous electrode is printed on the top side of the insulating layer such that the electrode is formed in the opening in the insulating layer. The sensor also comprises at least one additional electrode. The electrolyte is then formed on top of the electrodes. A cap is formed over the electrodes and electrolyte. This arrangement may easily be produced using micromachining techniques.

According to a first aspect of this disclosure there is provided an electrochemical sensor comprising a substrate, an insulating layer, at least two electrodes, at least one the electrodes being a porous electrode, and an electrolyte; wherein the at least one porous electrode is formed in an opening in the insulating layer, the electrolyte is formed as a layer over the electrodes and the insulating layer, the substrate has at least one hole formed therein, and the sensor is arranged such that the porous electrode is exposed to the environment through the at least one hole in the substrate.

According to a second aspect of this disclosure there is provided a method of manufacturing an electrochemical sensor, comprising: forming an insulating layer on a substrate; providing at least one hole in the substrate; providing an opening in the insulating layer; forming at least one porous electrode in the opening in the insulating layer such that the at least one electrode is exposed to the environment through the substrate; forming at least one additional electrode, over the insulating layer; forming a layer of electrolyte over the electrodes and the insulating layer.

According to a third aspect of this disclosure there is provided a method of manufacturing a plurality of electrochemical sensors on a wafer, the method comprising: processing a wafer substrate to partially construct a plurality of electrochemical sensors; providing a capping wafer comprising a plurality of caps; bonding the caps to the partial sensors to align the caps with the partial sensors; and dicing the resulting structure to produce a plurality of sensors.

Further features of the disclosure are defined in the appended claims.

BRIEF DESCRIPTION OF THE DRAWINGS

The teachings of this disclosure will be discussed, by way of non-limiting examples, with reference to the accompanying drawings, in which:

FIGS. 16A and 16B show cross sections through cap wafers in accordance with an embodiment of the disclosure.

DETAILED DESCRIPTION

The present disclosure provides an electrochemical sensor formed on a silicon substrate. In particular, the disclosure is concerned with a back-side sensor, in which exposure to environmental gases is through the back of the sensor. As such, in order for the gases to reach the electrode, or electrodes, and electrolyte formed on the top of the substrate, microcapillaries are formed in the substrate. Additionally, being silicon, an insulating layer must be formed on the top side of the substrate, in order to isolate the conductors from the substrate. In order to allow the gases to reach the electrodes, an opening is formed in the insulating layer, and the opening is aligned with the microcapillaries. The electrodes are screen or stencil printed onto the insulating layer, such that one of the electrodes is formed in the opening in the insulating layer, and against the top surface of the substrate. As an alternative, the electrodes may be deposited using lithographic deposition techniques. In order for the gases and the electrolyte to interact, the electrode is porous. A benefit of such an arrangements is that it is easily manufactured using micromachining techniques. As such, the sensors may be reduced in size, and produced in such a manner that multiple sensors have the same characteristics. Process variations are not as great as for prior art sensors that are made individually.

Figure 1:
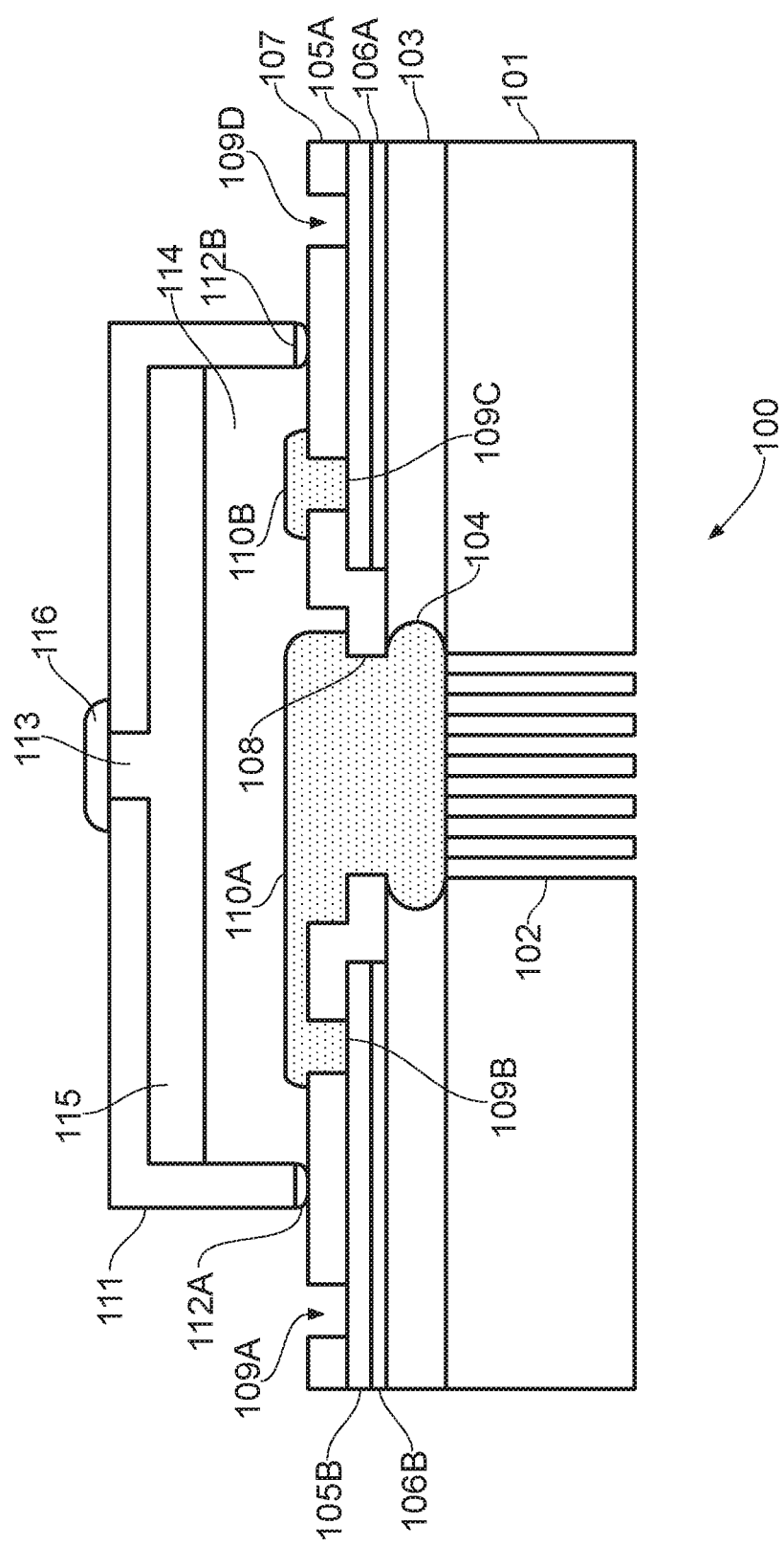
FIG. 1 is a cross-section through an electrochemical sensor according to a first embodiment.

FIG. 1 shows a cross-section through an electrochemical sensor 100 formed on silicon using micromachining techniques. The electrochemical sensor is formed on a silicon substrate 101. In this example, a single sensor is formed on the silicon substrate 101. However, in practice, several sensors may be formed on a single substrate, in a similar manner to the way in which multiple integrated circuits may be formed on a single silicon substrate. As an alternative to silicon, the substrate may be made from glass, ceramic or plastic. A plurality of microcapillaries 102 are formed in the substrate 101. In FIG. 1, six microcapillaries are shown in cross-section. However, the microcapillaries 102 are also formed across the width of the substrate, and as such there are typically ten or more microcapillaries. Each microcapillary is formed in a direction orthogonal to the surface of the substrate 101, and extends from an upper surface to a lower surface of the substrate. Each microcapillary is approximately 20 µm in diameter, although each microcapillary may be in the range of 1 µm to 2 mm in diameter. The group of microcapillaries 102 is approximately 1 mm across, but may be in the range of 0.001 mm to 3 mm across.

An insulating layer 103 is formed on the upper surface of the substrate 101. The insulating layer 103 may be formed from silicon oxide ($SiO_2$) and is approximately 4 µm thick. An electrode opening 104 is formed in the insulating layer 103 in a position that is aligned with the microcapillaries 102. The opening is described as being aligned in the sense that the microcapillaries are formed in an area defined by the opening in the insulating layer. The walls of the opening 104 are not necessarily precisely aligned with the walls of the microcapillaries. In this example, the opening 104 is approximately circular, but may be square or rectangular. The opening 104 may be 1 to 2 mm across. The side walls of the opening 104 are semi-circular in shape. However, it will be appreciated that the side walls may be straight or may be formed from any other shape that increases the surface area of the side walls. Conductive tracks 105A, 105B are formed on a top surface of the insulating layer 103. The conductive tracks 105A, 105B are adhered to the insulating layer 103 by an adhesion layer 106A, 106B. The conductive tracks 105A, 105B may be made of gold or any other suitable conductive material. For example, the conductive tracks may be made from metal or conductive plastic. The conductive tracks are arranged such that they stop approximately 25 µm from the edge of the opening 104. The tracks may stop anywhere between a few microns to a few millimeters from the edge of the opening. The conductive tracks 105A, 105B are for connecting the electrodes to external circuit elements. The conductive tracks may extend into the opening formed in the insulating layer 103. Additionally the conductive tracks may extend into the capillaries in order to improve contact resistance.

A passivation layer 107 is formed over the insulating layer 103 and the conductive tracks 105A, 105B. An opening 108 is formed in the passivation layer 107. The opening 108 is the same size as the electrode opening 104, and is aligned with the opening 104. Additional holes 109A, 109B, 109C, 109D are formed in the passivation layer to allow connections to be made between the electrodes (discussed below) and external circuit elements. Additional holes may be added for sensors with more than two electrodes.

As FIG. 1 shows a cross-section through the sensor 100, only a working electrode 110A and a counter electrode 110B are shown. The working electrode 110A is formed in the openings 104 and 108. The electrode completely fills the openings 104 and 108 and abuts the top surface of the substrate 101. The working electrode 110A extends approximately 25 µm above the top of the passivation layer 107. The working electrode 110A also extends into hole 109B. This provides an electrical connection to conductive track 105B, allowing connections to external circuit elements via hole 109A. A counter electrode 110B is formed in hole 109C. Counter electrode 110B also extends 25 µm above the passivation layer 107. The counter electrode 110B also extends into hole 109C. This provides an electrical connection to conductive track 105A, allowing connections to external circuit elements via hole 109D. The electrode 110A is printed directly on the microcapillaries 102. As such, the electrolyte 114 may be liquid. The electrode 110A prevents the electrolyte passing through the microcapillaries. The electrodes are porous and are made of a catalyst, such as platinum, and a fluoropolymer, such as polytetrafluoroethylene (PTFE). The electrode 110A thus provides the 3-phase porous surface required for the chemical reactions to take place. The catalyst is a medium to high surface area porous catalyst, such as platinum black. Sufficient catalyst is provided to ensure sufficient catalytic activity throughout the sensors lifetime. The catalyst may be one of platinum, gold, ruthenium, carbon black or iridium. Other appropriate materials may be used.

A cap 111 is formed over the electrodes 110A, 110B. In embodiments where additional electrodes are used, the cap 111 would also be formed over those electrodes. The cap may be formed from glass, ceramic, silicon or plastic. The cap 111 is sealed to the passivation layer 107 by epoxy/adhesive or fit glass 112A, 112B. Other bonding techniques may be used. A hole 113 is formed in the top of the cap 111. An electrolyte 114 is provided within the cap 111. Alternatively, two or more holes may be formed in the cap 111. This would enable the electrolyte to be vacuum filled. The electrolyte 114 may be made from a liquid solution, such as a conductive aqueous electrolyte or organic electrolyte, a conductive polymer, such as Nafion or PEDOT:PSS. The electrolyte may also be a hydrogel or a room temperature ionic liquid. In one example, the electrolyte may be sulfuric acid solution and may include a wicking material or wicking substructure. The electrolyte may be a two-layer electrolyte. The electrolyte 114 completely covers the electrodes, but when using liquid electrolytes, does not completely fill the cap 112. Instead, a void space 115 is left towards the top of the cap 111. The void space 115 may not be required when using conductive polymer electrolytes and hydrogels. Epoxy glue 116 is formed over the hole 113 to prevent any pollutants entering the cap, and also to prevent the electrolyte 114 from leaving the cap. Other options may be utilized for sealing. If two holes are provided in the cap 111, a seal may be formed over both holes. Alternatively, a larger hole could be covered with an adhered lid, once the cavity is filled.

If the cap 111 is made from plastic, the plastic material must be compatible with the electrolyte 114. Various plastic materials may be used. For example, the cap may be made from acrylonitrile butadiene styrene (ABS), PTFE, polycarbonate (PC), polyethylene (PE), amongst other plastics. Important properties of the plastic are its chemical resistance and its compatibility with the electrolytes.

In FIG. 1, the conductive tracks 105A, 105B are provided over the insulating layer 103. The openings 109A, 109D are provided outside of the cap 111 in order to allow the sensor to be connected to external devices. It may be preferable to omit the portion of the substrate 101 and insulting layer 103 that extend outside of the cap 111, in order to reduce the size of the sensor 100. In order to facilitate this, the conductive tracks may be omitted, and conductive vias may be formed through the substrate instead. This would enable connections to be made on the underside of the substrate 101. Additionally, the size of the substrate 101 may be reduced to the size of the cap 111.

Figure 2:
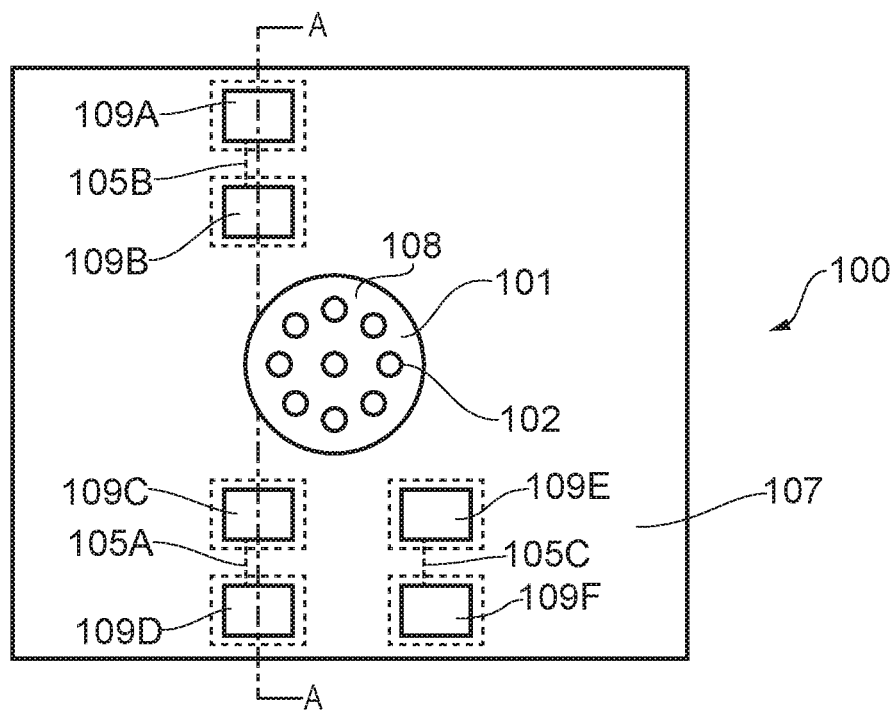
FIG. 2 is a top view of the sensor shown in FIG. 1.

The microcapillaries 102 may be lined with an insulating material. The purpose of this would be to electrically insulate the silicon substrate 101 from the electrodes. FIG. 2 is a top view of the sensor 100 with certain components removed for clarity. In particular, the cap 111, the electrolyte 114, and the electrodes 110, are not shown. Holes 109A, 109B, 109C, 109D are shown in passivation layer 107. Additionally, holes 109E, 109F are formed in passivation layer 107. These additional holes are for accommodating an additional electrode not shown in FIG. 1. Holes 109E and 109F would not be needed in a two-electrode sensor. Opening 108 is also shown in FIG. 2, as well as a top surface of a portion of the substrate 101. The microcapillaries 102 are shown in the substrate 101. The sensor 100 also includes conductive tracks 105A, 105B, 105C. Broken line A-A represents the cross-section shown in FIG. 1.

Figure 3:
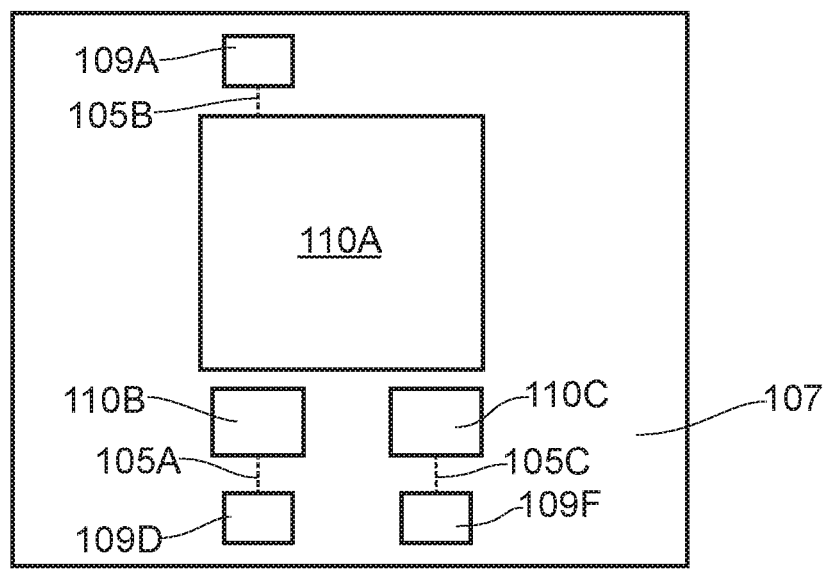
FIG. 3 is a further top view of the sensor shown in FIG. 1.

FIG. 3 shows the same top view as FIG. 2, with the addition of the electrodes 110. In particular, FIG. 3 shows working electrode 110A, counter electrode 110B and reference electrode 110C. Hole 109A provides access to a conductive track which is coupled to electrode 110A. Hole 109D provides access to a conductive track which is coupled to counter electrode 110B. Hole 109F provides access to a conductive track which is coupled to reference electrode 110C.

FIGS. 2 and 3 show a sensor with particular dimensions. These dimensions may be altered. For example, the opening 108 may be much larger than shown in FIG. 2, and in particular may cover much of the area occupied by the electrode 110A. The length and width of each sensor may be in the range of 1 mm to 10 mm. The overall thickness, including the substrate 101 and the cap 111 may be 1 mm. As such, on a typical 200 mm wafer, in excess of 1000 sensors may be produced.

In use, the sensor would be connected to a micro-controlled measurement system in a manner familiar to those skilled in the art. The sensor output may be continuously monitored and used to determine the concentration of analyte in the environment. The electrode 110A may come into contact with environmental gases via the microcapillaries 102. As the electrode 110A is porous, the environmental gases are able to pass through the electrode to a point where they come into contact with the electrolyte 114. A three-phase junction is therefore formed within the electrode. An advantage of using a printed, solid electrode 110A, is that it prevents the electrolyte 114 from escaping through the microcapillaries 102 in the substrate 101.

An advantage of the above-described structure is that silicon micromachining techniques can be used in its construction. As such, manufacturing of the sensor is compatible with fabrication techniques used to manufacture integrated circuits. By manufacturing multiple sensors in parallel, variations in the parameters of the sensors are reduced.

A further advantage of using silicon fabrication techniques is that the cost of each device is reduced. This is because each process step is applied to multiple sensors in parallel, so the processing cost per device is small. Additionally, micromachining techniques enable very small devices to be produced. As such, the sensors may be more easily incorporated into handheld devices. Furthermore, the sensors all see the same processing steps at the same time. As such, matching between devices is very good when compared with serially produced devices.

A method of fabricating the electrochemical sensor 100 will now be described with reference to FIGS. 4A to 4I.

Figure 4A:
FIG. 4A schematically illustrates a substrate at an initial phase of a fabrication process for the sensor shown in FIG. 1.

FIG. 4A shows the first step in the fabrication process. A silicon wafer is used as the silicon substrate 101. In the following, the process for forming one device will be described, however several hundred devices may be formed in parallel on the same wafer. The silicon substrate 101 is used for mechanical support, and could be substituted for another type of material, such as glass.

Figure 4B:
FIG. 4B shows the substrate after formation of an insulating layer.

An oxide insulating layer 103 is deposited on the wafer, as shown in FIG. 4B. The oxide layer serves as a "landing" oxide to stop the through wafer etch, and also serves as a layer to insulate the conductive tracks from the substrate to prevent shorting.

Figure 4C:
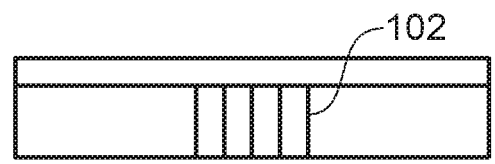
FIG. 4C shows the substrate after formation of microcapillaries.

The microcapillaries 102 are defined in the wafer by photolithography. The microcapillaries are etched through the wafer using an isotropic dry etch. They are etched from the backside of the wafer and stop at the oxide layer once the silicon wafer has been etched through, as shown in FIG. 4C.

Figure 4D:
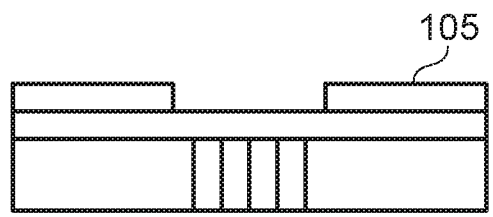
FIG. 4D shows the substrate after formation of a metal layer.

FIG. 4D shows formation of inert metal layers which form the conducting tracks 105. They are deposited on the insulation layer, on the front side of the wafer. An adhesive layer 106 is first deposited on the insulating layer 103, and is used to attach the metal layer to the insulating layer 103. The conductive tracks may be defined by photolithography and then etched. The thickness of the inert metal can be increased by electroplating in specific areas, as defined by photolithography.

Figure 4E:
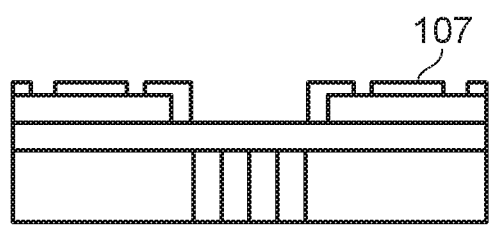
FIG. 4E shows the substrate after deposition and definition e passivation layer.
Figure 4F:
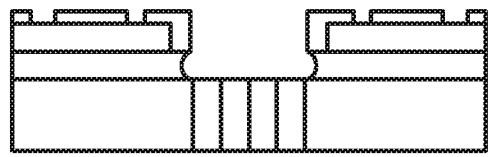
FIG. 4F shows the substrate after removal of a portion of the insulating layer.

FIG. 4E shows the sensor after deposition and definition of the passivation layer 107. The insulating oxide 103 on the front side of the wafer 101 is removed in the region of the microcapillaries 102 using a wet etch, as shown in FIG. 4F.

Figure 4G:
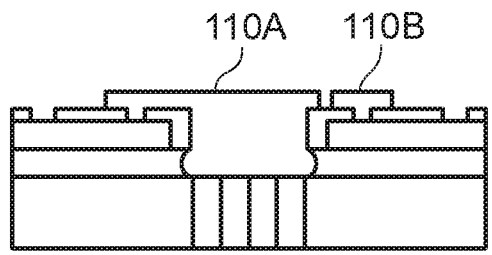
FIG. 4G shows the substrate after deposition of electrodes.

A porous electrode material is deposited on the wafer using screen printing, stencil printing, electroplating, or other lithographic deposition techniques to form electrodes 110A and 110B, as shown in FIG. 4G. Electrode 110A covers the microcapillaries 102, and connection is made to the conductive tracks.

Figure 4H:
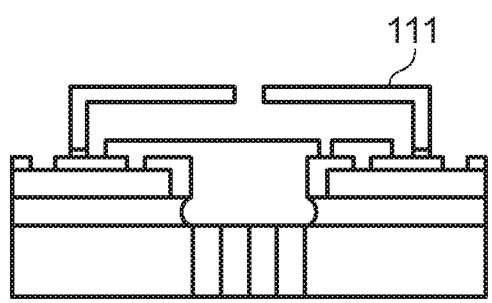
FIG. 4H shows the substrate after application of a cap.

The cap 111 is then placed over the sensor 100, as shown in FIG. 4H. As described above, the cap 111 may be made of plastic, ceramic, silicon or glass, amongst other materials. If the cap is made of plastic, it is prefabricated by injection molding. The recess and holes may be formed during the injection molding process. If the cap is made from glass, silicon or ceramic, the cap would typically be fabricated using wafer level processing techniques. For glass or ceramic caps, cavities can be made in the cap by firstly using photolithography to pattern the cap cavity. Then one of, or a combination of, wet etching, dry etching, sand blasting and laser drilling may be used to create the cavities in the cap. For silicon caps, cavities can be made in the cap by firstly using photolithography to pattern the cap cavity. Then one of, or a combination of, wet etching, dry etching, sand blasting, and laser drilling may be used to create the cavities in the cap.

Figure 4I:
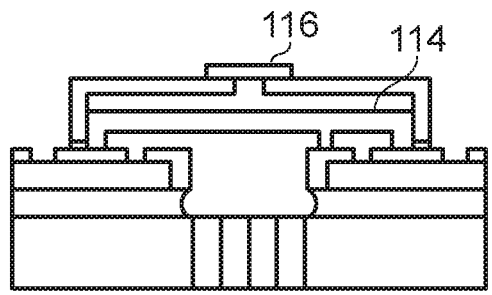
FIG. 4I shows the substrate after insertion of an electrolyte and formation of a cap.

The cap 111 is attached to the wafer through wafer bonding (wafer processing) or through placement with epoxy/adhesive on the sensor wafer (single cap placement process). Alternatively, the cap 111 may be attached by other means such as ultrasonics. The electrolyte 114 is dispensed through the cap hole 113 and the hole is sealed, as shown in FIG. 4I. As noted above, the cap 111 may have more than one hole.

Figure 5:
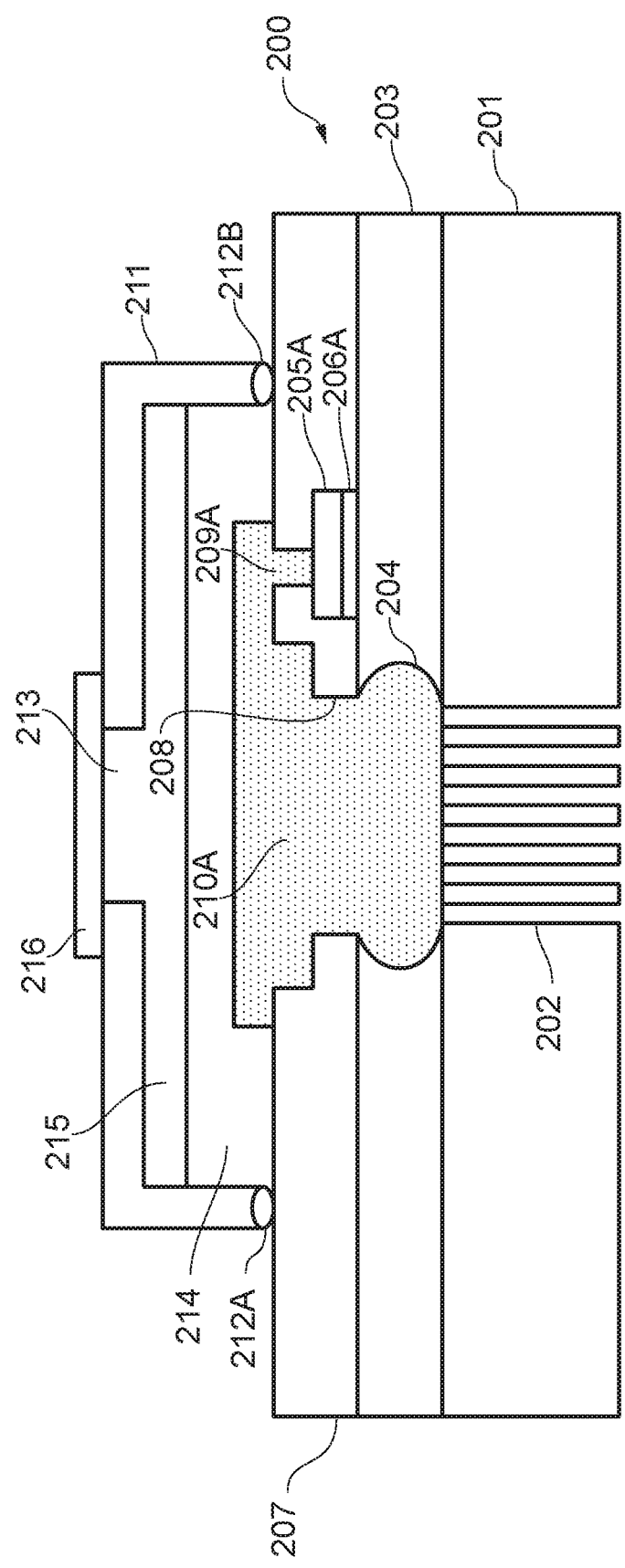
FIG. 5 is a cross-section through an electrochemical sensor according to a second embodiment.

FIG. 5 shows an alternative embodiment in accordance with the present disclosure. Most of the structure is the same as that shown in FIG. 1. An electrochemical sensor 200 includes a substrate 201 having a plurality of microcapillaries 202 formed therein. An insulating layer 203 is formed on a top surface of the substrate 201, and has an electrode opening 204 formed in a position aligned with the microcapillaries 202. A conductive pad 205A is formed on the insulating layer 203 and is attached thereto by adhesion layer 206A.

A passivation layer 207 is formed over the insulating layer 203, and has an opening 208 formed therein. The opening 208 is aligned with the opening 204. In addition, the passivation layer includes a hole 209A aligned with the conductive pad 205A. A working electrode 210A is formed in the openings 204 and 208, as well as in the opening 209A. A cap 211 is formed over the electrode 210A, and is attached to the passivation layer using adhesive 212A and 212B, or through water bonding. A hole 213 is formed in the top of the cap 211, and is for providing electrolyte 214 within the cap 211. A void space 215 may be formed above the electrolyte 214 if a liquid electrolyte is used, and an epoxy glue cap is provided over the opening 213. As noted above, other sealing techniques may be used to cover the opening 213.

Figure 6:
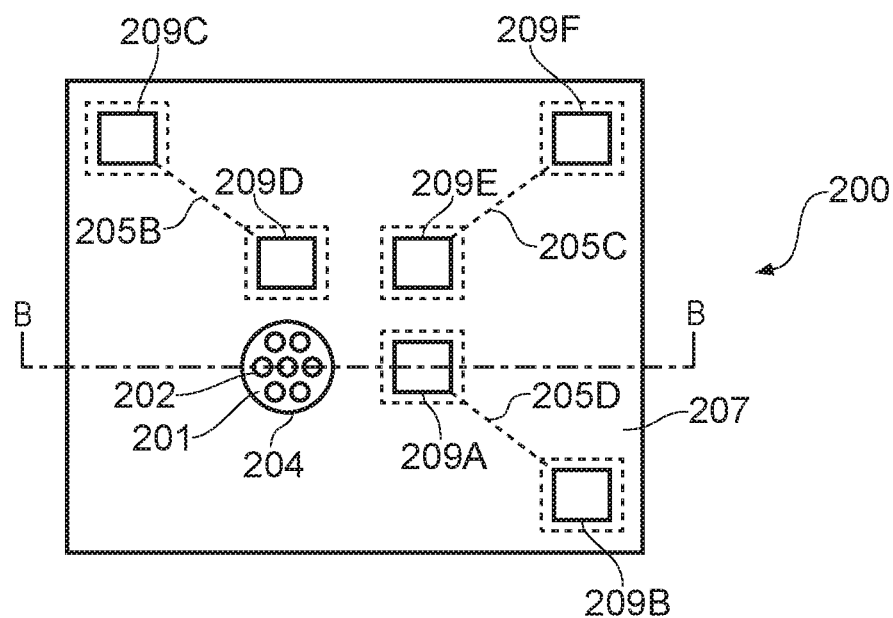
FIG. 6 is a top view of the sensor shown in FIG. 5.

FIG. 6 shows a top view of the electrochemical sensor 200 with various components removed. In particular, the electrode 210A, the electrolyte 214 and the cap 211 are not shown. The broken line B-B represents the cross-section of FIG. 5. As can be seen in FIG. 5, opening 204 and hole 209A are formed in passivation layer 207. Additionally, holes 209B, 209C, 209D, 209E, 209F are also formed in passivation layer 207.

Figure 7:
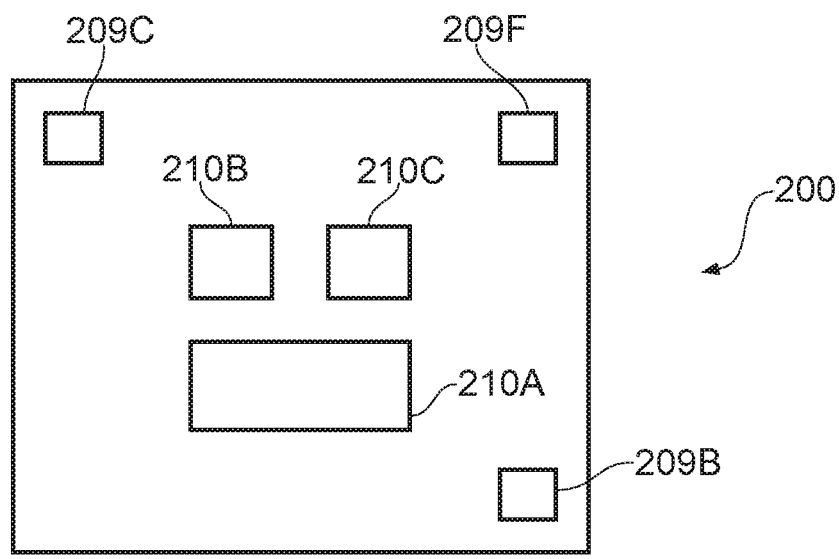
FIG. 7 is a further top view of the sensor shown in FIG. 5.

FIG. 7 also shows the same top view of electrochemical sensor 200. In this example, electrode 210A is shown formed over opening 204 and hole 209A. Additionally, counter electrode 210B and reference electrode 210C are also shown.

Figure 8:
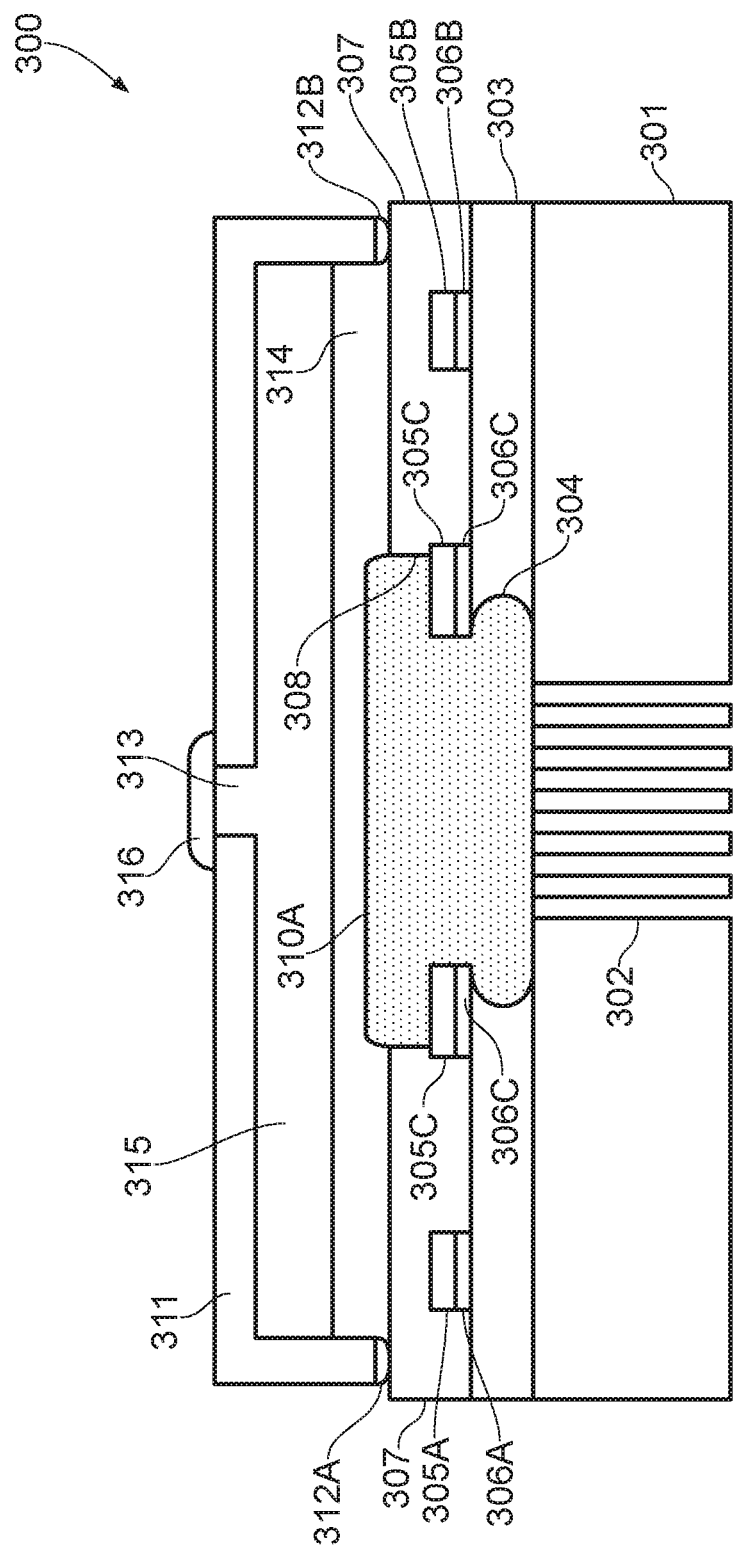
FIG. 8 is a cross-section through an electrochemical sensor according to a third embodiment.

FIG. 8 shows a further alternative embodiment in accordance with the present disclosure. Most of the structure is the same as that shown in FIGS. 1 and 5. An electrochemical sensor 300 includes a substrate 301 having a plurality of microcapillaries 302 formed therein. An insulating layer 303 is formed on a top surface of the substrate 301, and has an electrode opening 304 formed in a position aligned with the microcapillaries 302.

Conductive tracks 305A, 305B are formed on the insulating layer 303 and are attached thereto by adhesion layers 306A, 306B. The purpose of these tracks is to connect electrodes (not shown in FIG. 8) to external connections (also not show in FIG. 8). These tracks will be made clearer below in connection with FIGS. 9 and 10. A conductive pad 305C is also formed on the insulating layer 303, and is attached to the insulting layer using adhesion layer 306C. Conductive pad 305C is formed around the opening 304 in the insulating layer 303. This will be shown more clearly below in connection with FIGS. 9 and 10.

A passivation layer 307 is formed over the insulating layer 303 and the conductive tracks 305A, 305B and conductive pad 305C. The passivation layer 307 is not formed over the entire conductive pad 305C, and as such has an opening 308 formed therein. The passivation layer 307 overlaps the edges of the pad 305C by around 10 to 100 μm. The opening 308 is aligned with, but wider than, the opening 304. A working electrode 310A is formed in the openings 304 and 308, as well as over the conductive pad 305C.

A cap 311 is formed over the electrode 310A (and the other electrodes that are not shown), and is attached to the passivation layer 307 using adhesive 312A and 312B, or using wafer bonding. A hole 313 is formed in the top of the cap 311, and is for providing electrolyte 314 within the cap 311. A void space 315 may be formed above the electrolyte 314 if a liquid electrolyte is used, and an epoxy glue cap 316 is provided over the opening 313.

Figure 9:
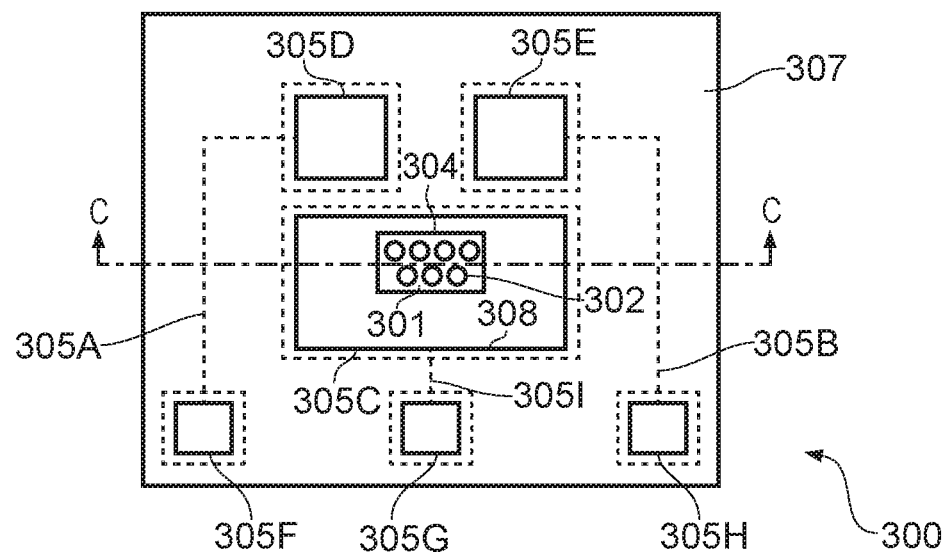
FIG. 9 is a top view of the sensor shown in FIG. 8.

FIG. 9 shows a top view of the electrochemical sensor 300 with various components removed. In particular, the electrodes 310A, 310B, 310C, the electrolyte 314 and the cap 311 are not shown. The broken line C-C represents the cross-section of FIG. 8. The conductive pad 305C is formed towards the middle of the sensor 300. The conductive pad 305C is formed around the opening 304 in the insulating layer 303. As such, the microcapillaries 302 may be seen in the substrate 301. The sensor 300 also includes two further conductive pads 305D and 305E. These pads are for having electrodes formed thereon. The sensor 300 also includes three external connection pads 305F, 305G, 305H. These pads are connected to respective electrode pads by respective tracks 305A, 305I and 305B. These tracks are shown as hashed lines as they are not visible through the passivation layer 307. The passivation layer 307 is formed over the insulating layer 303. The passivation layer covers the tracks 305A, 305I, and 305B, but does not cover the conductive pads 305C, 305D, 305E, 305F, 305G, 305H.

Figure 10:
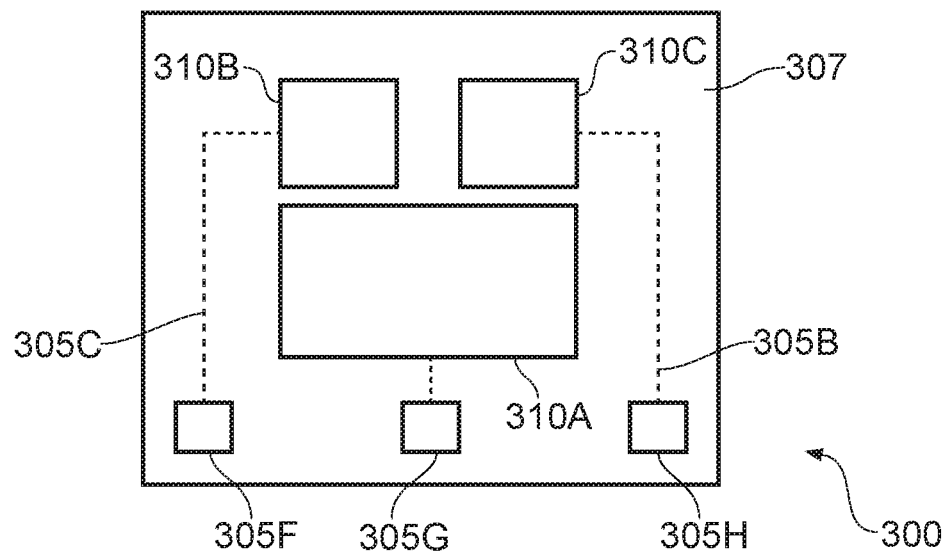
FIG. 10 is a further top view of the sensor shown in FIG. 8.

FIG. 10 also shows the same top view of electrochemical sensor 300. In this figure, electrode 310A is shown formed over openings 304, 308, and conductive pad 305C. Additionally, counter electrode 310B and reference electrode 310C are also shown.

Figure 11:
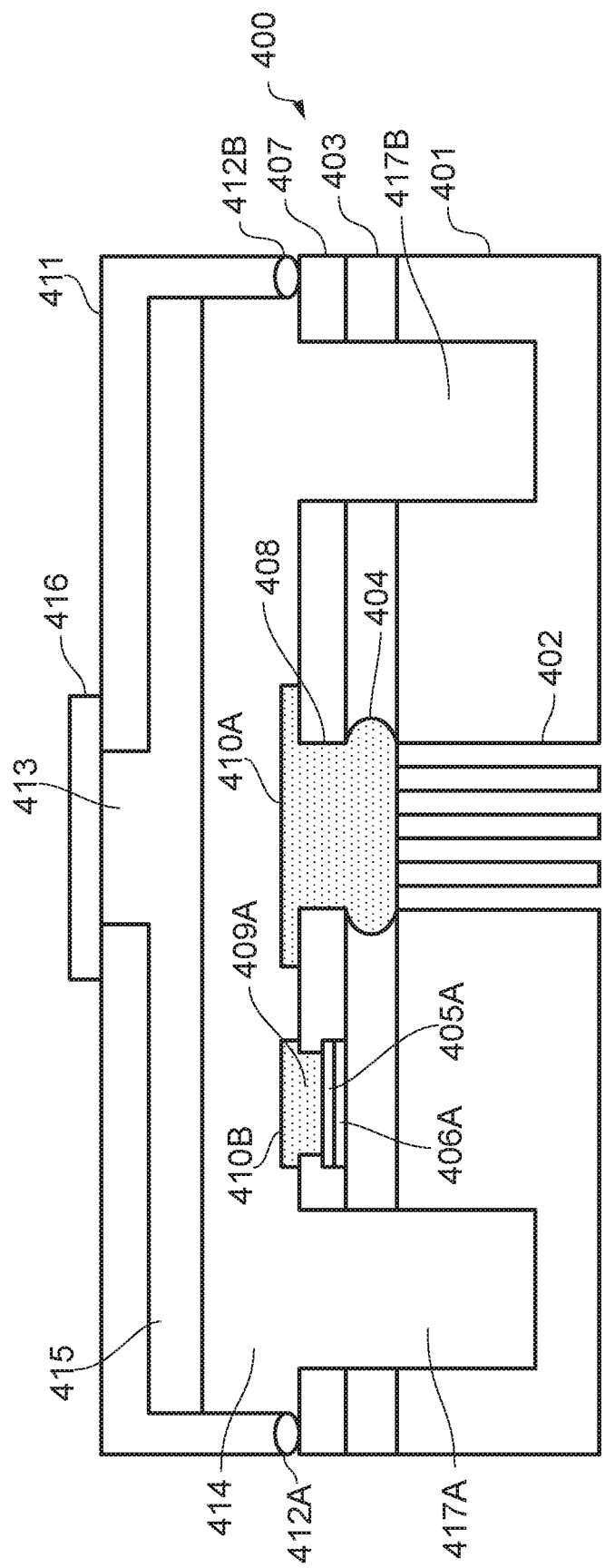
FIG. 11 is a cross-section through an electrochemical sensor according to a fourth embodiment.

FIG. 11 shows an example of an electrochemical sensor 400 in accordance with a further embodiment in the present disclosure. Most of the structure is the same as that shown in FIG. 1. The electrochemical sensor 400 includes a substrate 401 having a plurality of microcapillaries 402 formed therein. An insulating layer 403 is formed on a top surface of the substrate 401, and has an electrode opening 404 formed in a position aligned with the microcapillaries 402. Conductive pads 405 are formed on the insulating layer 403 and are attached thereto by adhesion layer 406.

A passivation layer 407 is formed over the insulating layer 403, and has an opening 408 formed therein. The opening 408 is aligned with the electrode opening 404. In addition, the passivation layer includes a hole 409A aligned with the conductive pad 405A. A working electrode 410A is formed in the openings 404 and 408. A counter electrode 410B is formed in the opening 409A. A cap 411 is formed over the electrodes 410, and is attached to the passivation layer 407 using adhesive 412A and 412B, or using wafer bonding processes). A hole 413 is formed in the top of the cap 411, and is for providing electrolyte 414 within the cap 411. A void space 415 may be formed above the electrolyte 414, when liquid electrolytes are used, and an epoxy glue cap 416 is provided over the opening 413. As with sensor 100, sensor 300 may include an additional reference electrode formed over an additional hole in the passivation layer.

In contrast with the previous embodiments, recesses 417A and 417B are formed in the substrate 401, the insulating layer 403, and the passivation layer 407. The electrolyte 414 fills recesses 417A and 417B and part of the cap volume. In FIG. 11, the substrate 401 forms the walls of the recesses 417A, 417B. As an alternative, the walls and base of the recesses 417A, 417B may be covered in a layer of insulating material. This layer may be the insulating layer 403. The purpose of this is to insulate the electrolyte from any galvanic path that may be formed through the silicon substrate to the electrodes. The insulating layer may be provided using thermal oxidation or vapor deposition.

Figure 12:
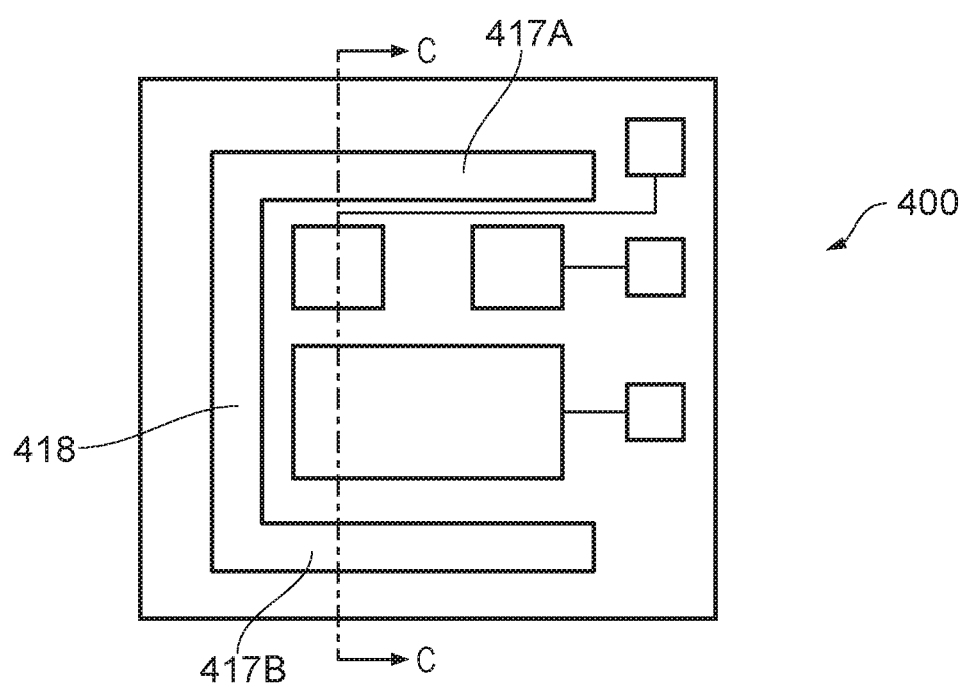
FIG. 12 is a top view of the sensor shown in FIG. 11.

FIG. 12 shows a top view of the electrochemical sensor 400 shown in FIG. 11. Here, the recesses 417A and 417B may be seen. The recesses together form a microwell 418. The microwell 418 forms a 'C' shape around the top, left and bottom sides of the electrodes 410. Other shapes may be used depending on the design of the sensor.

Figure 13A:
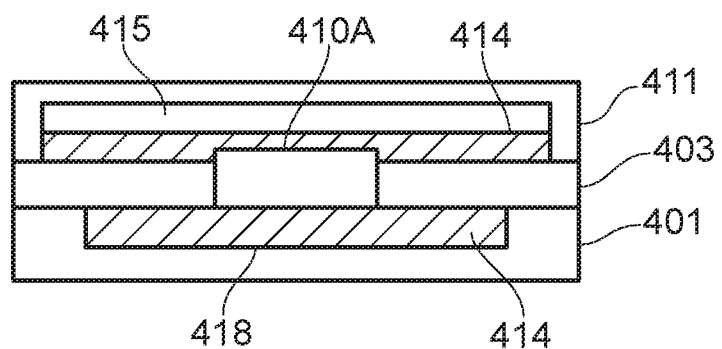
FIGS. 13A to 13C demonstrate the operation of the sensor of FIG. 11.
Figure 13B:
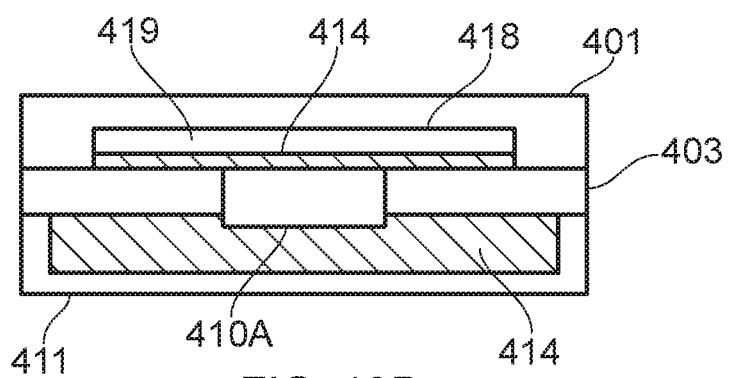
Figure 13C:
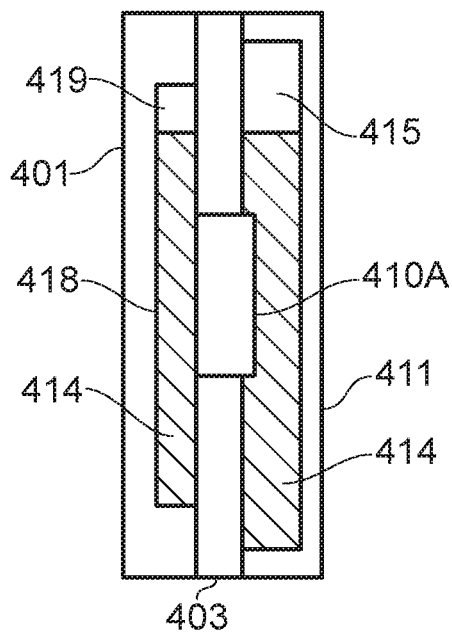

FIGS. 13A to 13C show the function of the microwell 418. In FIG. 13A, electrochemical sensor 400 is uptight, and the electrolyte 414 fills the microwells such that the electrolyte also covers the electrode 410A (as well as electrodes 410B and 410C which are not shown).

In FIG. 13B, the electrochemical sensor 400 is upside down. As can be seen, the electrolyte 414 now fills the cap 411, and a void space 419 is formed in the microwells 418. As such, the electrodes 410A, 410B and 410C are completely covered by the electrolyte 414.

In FIG. 13C, the electrochemical sensor 400 is shown on its side. Here, the electrolyte 414 fills the microwell 418 and the cap 411 such that a void space is provided in a portion of the cap 411 and the void space 418. As such, the electrodes 410 are completely covered by electrolyte 414. As can be seen, the advantage of providing microwells in this manner is that the electrodes are always covered by electrolyte no matter their orientation. A further benefit of using microwells is that an additional wicking material is not required in the sensor. Additionally, sensor life is improved because the sufficient electrolyte and void space are provided, even in extreme temperatures and humidity.

Figure 14A:
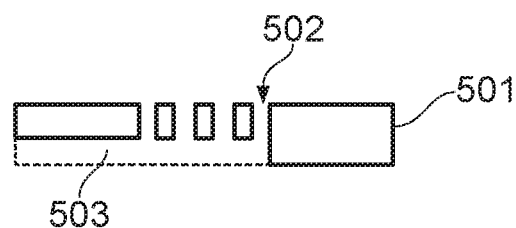
FIGS. 14A to 14C show cross sections through substrates in accordance with one or more embodiments disclosure.
Figure 14B:
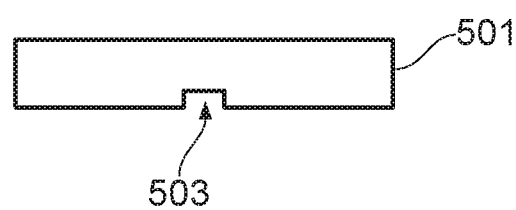
Figure 14C:
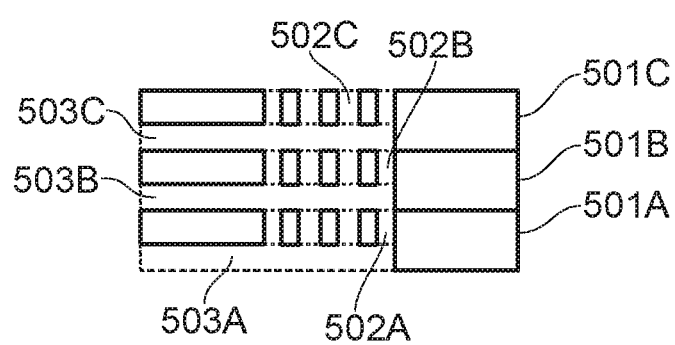

FIGS. 14A to 14C show a substrate 501 in accordance with a further embodiment of the present disclosure. FIG. 14A shows a cross-section through a substrate 501. FIG. 14B shows an end-view of the substrate 501. The substrate 501 is the same as the substrate 101 in most respects. In particular, the substrate 501 includes microcapillaries 502. However, in contrast to substrate 101, the substrate 501 includes a trench 503. The trench is formed in an underside of the substrate 501, and extends from the microcapillaries 502 to an edge of the substrate 501. The purpose of the trench is to enable environmental gases to reach the microcapillaries in the event the substrate 501 is placed on a solid surface. This would enable several sensors to be stacked, as shown in FIG. 14C. Alternatively, this would enable the sensor to be placed on another die, such as a microcontroller.

Figure 15:
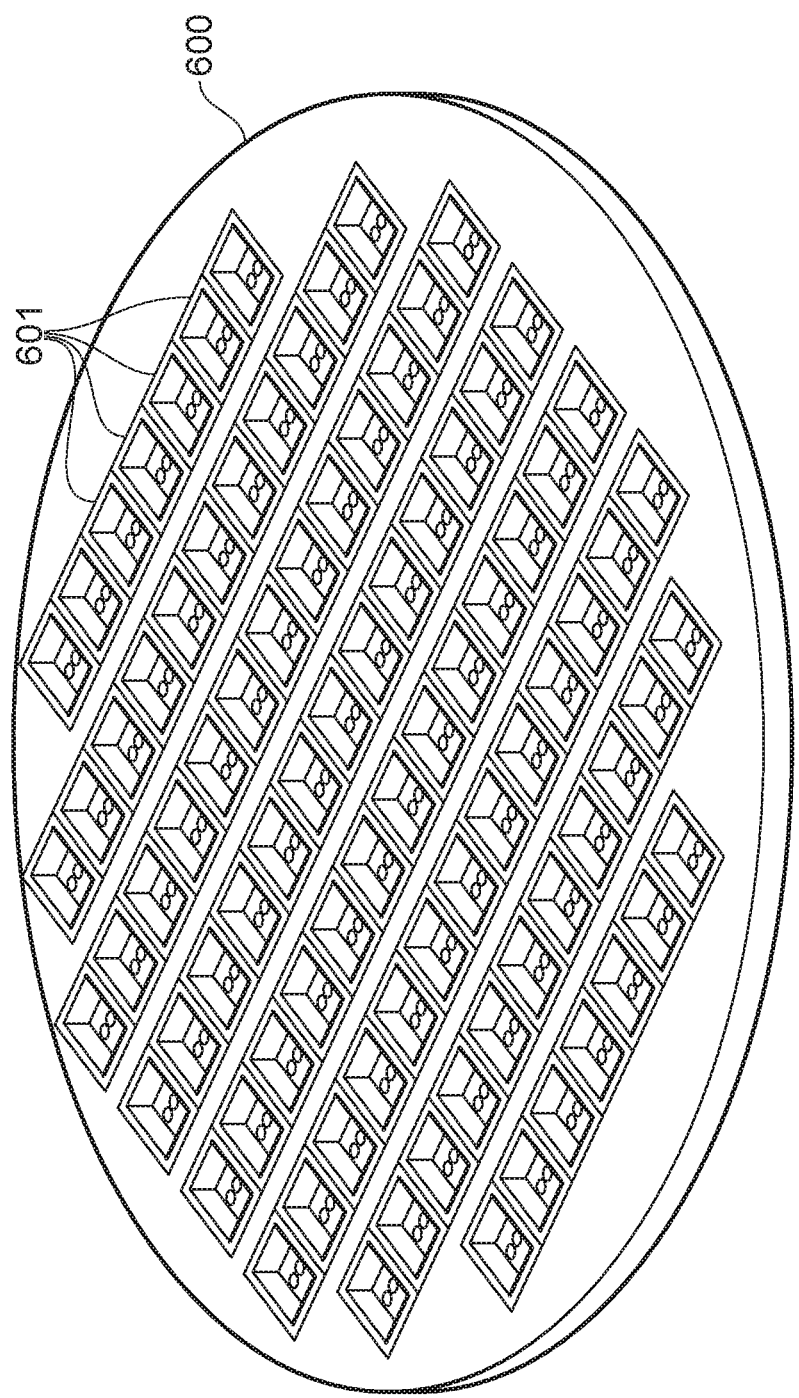
FIG. 15 shows a cap wafer in accordance with an embodiment of the disclosure.

FIG. 15 shows multiple caps formed in a wafer. In the process described above in connection with FIG. 4, the sensor dies and the caps are described as being formed on an individual level. Advantageously, the above-described sensors may be manufactured as multiple identical units using one or more wafers. Specifically, the substrate may be formed from a single wafer, and the sensors may be built up using parallel processing. Furthermore, a plurality of caps may be formed in a single wafer. FIG. 15 shows a wafer 600 which includes a plurality of caps 601. Several caps are formed in each of a number of parallel lines.

If forming the caps 601 from plastic, the entire wafer may be injection moulded to include the plurality of caps. The plastic caps in the wafer can then be bonded to the sensor wafer by epoxy glue, heat treatment or other means. Each cap may then be diced by laser cutting or other wafer dicing techniques. The caps could also be "partially" bonded to the sensor die by e.g. glue or heat treatment, then diced, and then doing the "complete" bonding with more glue, or other means. If forming the caps 601 from silicon, traditional wafer processing techniques may be used to form the caps.

Access for bond wires through the cap wafer to contact the sensor bondpads would be required. This could be done by forming holes which go through the cap wafer and align with the bondpads on the sensor wafer prior to wafer bond. Alternatively, vias may be formed in the substrate, as noted above, to avoid the need for openings in the cap. In the case of silicon, removal of unwanted silicon on the cap wafer to give access the bondpads on the sensor wafer could be done through a dicing and singulation process.

FIGS. 16A to 16B show cross sections through a wafer. In FIG. 16A, the wafer 600 includes a plurality of caps 601. Each cap includes two holes 602A, 602B. In this example, the caps are adjacent each other, with no spacing between the caps. In FIG. 16B, the same wafer is shown but with the cross-section orthogonal to the one shown in FIG. 16A. The wafer 600 includes a plurality of caps 601. Each cap includes a two holes, but only one of the holes 602A can be seen in this cross-section. In this cross-section, the caps include a spacing section 603, between each cap. In each case, the positioning 603 of the dicing procedure is shown.

The above-described sensors have a broad application space. For example, they are suitable for mobile sensing, smart phones, watches, wearables, etc. This is because of their small size, low manufacturing cost, and accuracy.

In a further embodiment of the disclosure, a sensor array may be provided. The sensor array may include two or more of the above-described sensors. All of the sensors in the array may be the same, and for detecting the same gases. The additional sensors may be included to provide redundancy. Alternatively the sensors may be for detecting different gases.

In a further embodiment, an integrated circuit comprising one of the aforementioned sensors may be provided. Alternatively an integrated circuit comprising the above-described sensor array may be provided.

In the above-described embodiments, a 3-electrode system has been described. The disclosure is also applicable to 2-electrode systems and systems with more than 3 electrodes. Different numbers and combinations of electrodes can be used to detect different gases. Furthermore, in above-described embodiments, only one of the electrodes is exposed to environmental gases, through one set of micro-capillaries. As an alternative, two or more of the electrodes may be exposed to environmental gases via two or more sets of microcapillaries.

In the above-described embodiments, generally the working electrode is porous. As an alternative, there may be two porous electrodes, and two openings may be provided in the insulating layer. A respective one of each porous electrode may be formed in a respective opening. The substrate may include two sets of microcapillaries, each one aligned with a respective opening in the insulating layer.

The above-described sensor has been described primarily in the context of gas sensing. However, the sensor may be used for liquid sensing.

The claims presented herein are in single dependency format suitable for filing at the United States Patent & Trademark Office. However it is to be assumed that each one of the claims can be multiply dependent on any preceding claim except where that is technically unfeasible.

The invention claimed is:

1. An electrochemical sensor comprising
a substrate comprising a single material, the substrate including a plurality of microcapillaries formed therein, the plurality of microcapillaries extending between a first major surface and a second major surface;
an insulating layer located on the first major surface of the substrate; the insulating layer including an opening aligned with the plurality of microcapillaries;
a porous electrode formed in the opening in the insulating layer and in direct contact with the first major surface of the substrate;
an electrolyte formed as a layer over the porous electrode and the insulating layer; and
wherein the plurality of microcapillaries are configured to expose the porous electrode to an environment external to the electrochemical sensor.

2. A sensor according to claim 1, wherein a portion of the porous electrode is supported by the first major surface of the substrate, in an area defined by the opening in the insulating layer.

3. A sensor according to claim 1, further comprising a cap formed over the insulating layer, wherein the electrolyte is provided within the cap, and at least partially fills the cap.

4. A sensor according to claim 3, further comprising at least one recess, formed in the first major surface of the substrate, in communication with the space defined by the cap, wherein the electrolyte is also provided within the recess.

5. A sensor according to claim 1, further comprising a second electrode exposed to the electrolyte and electrically isolated from the substrate by the insulating layer.

6. A sensor according to claim 1, further comprising a first conductive track coupled to the porous electrode and coupled to the insulating layer.

7. A sensor according to claim 6, wherein the first conductive track extends into a microcapillary of the plurality of microcapillaries.

8. A sensor according to claim 7, further comprising:
a second conductive track coupled to the second electrode; and
a passivation layer, formed over the insulating layer, the first conductive track, and the second conductive track, the passivation layer having two or more holes formed therein, the two or more holes being aligned with portions of the first and second conductive tracks.

9. A sensor according to claim 1, wherein the electrolyte includes one of an aqueous or organic liquid electrolyte, a jellified electrolyte-hydrogel, a conductive polymer, and a room-temperature ionic liquid.

10. A sensor according to claim 9, wherein the electrolyte is a two-layer electrolyte.

11. A sensor according to claim 1, further comprising a trench, formed on the underside of the substrate, to enable gases to reach a microcapillary of the plurality of microcapillaries.

12. The electrochemical sensor of claim 1, wherein the porous electrode is printed directly on the substrate.

13. An integrated circuit comprising:
a first electrochemical sensor comprising:
a monolithic substrate including a plurality of microcapillaries formed therein, the plurality of microcapillaries extending between a first major surface and a second major surface;
an insulating layer located on the first major surface of the monolithic substrate, the insulating layer including an opening aligned with the plurality of microcapillaries;
a porous electrode formed in the opening in the insulating layer and in direct contact with the first major surface of the monolithic substrate;
an electrolyte formed as a layer over the porous electrode and the insulating layer; and
wherein the plurality of microcapillaries are configured to expose the porous electrode to an environment, the environment external to the electrochemical sensor at the second major surface.

14. The integrated circuit of claim 12, including a plurality of second electrochemical sensors arranged in an array with the first electrochemical sensor.

15. The integrated circuit of claim 12, further comprising a first conductive track coupled to the porous electrode and coupled to the insulating layer.

16. The integrated circuit of claim 15, wherein the first conductive track extends into a microcapillary of the plurality of microcapillaries.

17. The integrated circuit of claim 16, further comprising:
a second electrode exposed to the electrolyte and electrically isolated from the monolithic substrate by the insulating layer;
a second conductive track coupled to the second electrode; and
a passivation layer, formed over the insulating layer, the first conductive track, and the second conductive track, the passivation layer having two or more holes formed therein, the two or more holes being aligned with portions of the first and second conductive tracks.

18. A sensor according to claim 1, further comprising a trench, formed on an underside of the substrate, the trench configured to enable gases to reach a microcapillary of the plurality of microcapillaries.

19. A electrochemical sensor comprising:
a first electrode and a second electrode configured to invoke current flow as a result of a reaction at the first electrode;
a substrate comprising a single material, the substrate including a plurality of microcapillaries formed therein, the plurality of microcapillaries extending between a first major surface and the first electrode, the first electrode in direct contact with a second major surface of the substrate;
means for insulating the second electrode from the second major surface of the substrate;

an electrolyte configured to electrically couple the first electrode and the second electrode;
wherein the first electrode is configured to allow a target material of an environment to interact with the electrolyte; and
wherein the plurality of microcapillaries are configured to expose the first electrode to the environment, the environment external to the electrochemical sensor at the first major surface of the substrate.

20. The electrochemical sensor of claim 19, including:
a first conductive track coupled to the first electrode;
a second conductive track coupled to the second electrode; and
a passivation layer, formed over the means for insulating, the first conductive track, and the second conductive track, the passivation layer having two or more holes formed therein, the two or more holes being aligned with portions of the first and second conductive tracks.

\* \* \* \* \*

UNITED STATES PATENT AND TRADEMARK OFFICE
CERTIFICATE OF CORRECTION

PATENT NO. : 10,620,151 B2  
APPLICATION NO. : 15/251833  
DATED : April 14, 2020  
INVENTOR(S) : Berduque et al.

Page 1 of 1

It is certified that error appears in the above-identified patent and that said Letters Patent is hereby corrected as shown below:

In the Claims

Column 11, Line 39, Claim 2, delete "A" and insert --The-- therefor

Column 11, Line 43, Claim 3, delete "A" and insert --The-- therefor

Column 11, Line 46, Claim 4, delete "A" and insert --The-- therefor

Column 11, Line 51, Claim 5, delete "A" and insert --The-- therefor

Column 11, Line 54, Claim 6, delete "A" and insert --The-- therefor

Column 11, Line 57, Claim 7, delete "A" and insert --The-- therefor

Column 11, Line 60, Claim 8, delete "A" and insert --The-- therefor

Column 12, Line 1, Claim 9, delete "A" and insert --The-- therefor

Column 12, Line 5, Claim 10, delete "A" and insert --The-- therefor

Column 12, Line 7, Claim 11, delete "A" and insert --The-- therefor

Column 12, Line 32, Claim 14, delete "claim 12," and insert --claim 13,-- therefor Column 12, Line 35, Claim 15, delete "claim 12," and insert --claim 13,-- therefor Column 12, Line 52, Claim 18, delete "A" and insert --The-- therefor Signed and Sealed this  
Fourth Day of August, 2020

Andrei Iancu  
*Director of the United States Patent and Trademark Office*